US012579103B1

(12) United States Patent
Rangavajjula et al.

(10) Patent No.: US 12,579,103 B1
(45) Date of Patent: Mar. 17, 2026

(54) METHOD AND SYSTEM FOR PERFORMING READ/WRITE OPERATIONS IN DATABASE SYSTEMS INCLUDING MANAGED OBJECT STORES

(71) Applicant: Teradata US, Inc., San Diego, CA (US)

(72) Inventors: KN Sai Krishna Rangavajjula, Andhra Pradesh (IN); Chandrasekhar Tekur, Andhra Pradesh (IN)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 18/986,501

(22) Filed: Dec. 18, 2024

(51) Int. Cl.
*G06F 16/176* (2019.01)
*G06F 16/13* (2019.01)

(52) U.S. Cl.
CPC ........ *G06F 16/137* (2019.01); *G06F 16/1767* (2019.01)

(58) Field of Classification Search
CPC .......................... G06F 16/137; G06F 16/1767
See application file for complete search history.

(56) References Cited

U.S. PATENT DOCUMENTS

| | | | | |
|---|---|---|---|---|
| 11,500,815 | B2 * | 11/2022 | Singh | G06F 16/1734 |
| 11,645,233 | B2 * | 5/2023 | Zhao | G06F 16/172 |
| | | | | 711/118 |

* cited by examiner

*Primary Examiner* — Tony Mahmoudi
*Assistant Examiner* — Nirav K Khakhar
(74) *Attorney, Agent, or Firm* — James Stover

(57) ABSTRACT

A system and methods for performing read and write operations in a database system including a managed object store with an open table format. These systems and methods provide throughput/concurrency improvements for write operations employing position deletes by avoiding unnecessary transaction aborts due to possible write conflicts. A probabilistic structure, such as a bloom or cuckoo filter, is utilized to log row updates which are matched with delete file entries to identify conflicts at the row level in write operations. Similarly, improvements in the efficiency of read operations when employing an equity delete process are achieved by using bloom filters for logging object file data, which is matched with delete file entries to eliminate rows from consideration in read operations.

16 Claims, 5 Drawing Sheets

FIG. 4

METHOD AND SYSTEM FOR PERFORMING READ/WRITE OPERATIONS IN DATABASE SYSTEMS INCLUDING MANAGED OBJECT STORES

FIELD OF THE INVENTION

This invention relates generally to database management systems and external object storage systems, and more particularly, to improved methods for performing read and write operations in a database system including a managed object store with an open table format.

BACKGROUND OF THE INVENTION

A relational database management system (DBMS) stores databases that include collections of logically related data arranged in a predetermined format, such as in tables that contain rows and columns. To access the content of a table in a database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

In other examples, object stores can be used to store objects that are usually larger in size than rows of a table in a relational DBMS. The object stores can be provided in a cloud that is accessible over a network, for example.

Increasingly, managed object stores employ open table formats, such as Apache Iceberg and Delta Lake, to provide a layer of abstraction over, and provide database-like functionalities to the object store. Most of these open table formats/managed object stores employ concurrency control to enable multiple writers to simultaneously modify a table partition and allow readers to see a consistent view of the table. Unfortunately, write conflicts and read validation operations can negatively impact read and write operations. Described below are methods for reducing write conflicts and lowering read costs in database systems utilizing managed object stores and open table formats.

BRIEF DESCRIPTION OF THE DRAWINGS

Some implementations of the present disclosure are described with respect to the following figures.

FIG. 4 illustrates the use of bloom filters within object data file headers in a managed object store with an open table format.

Figure 1:
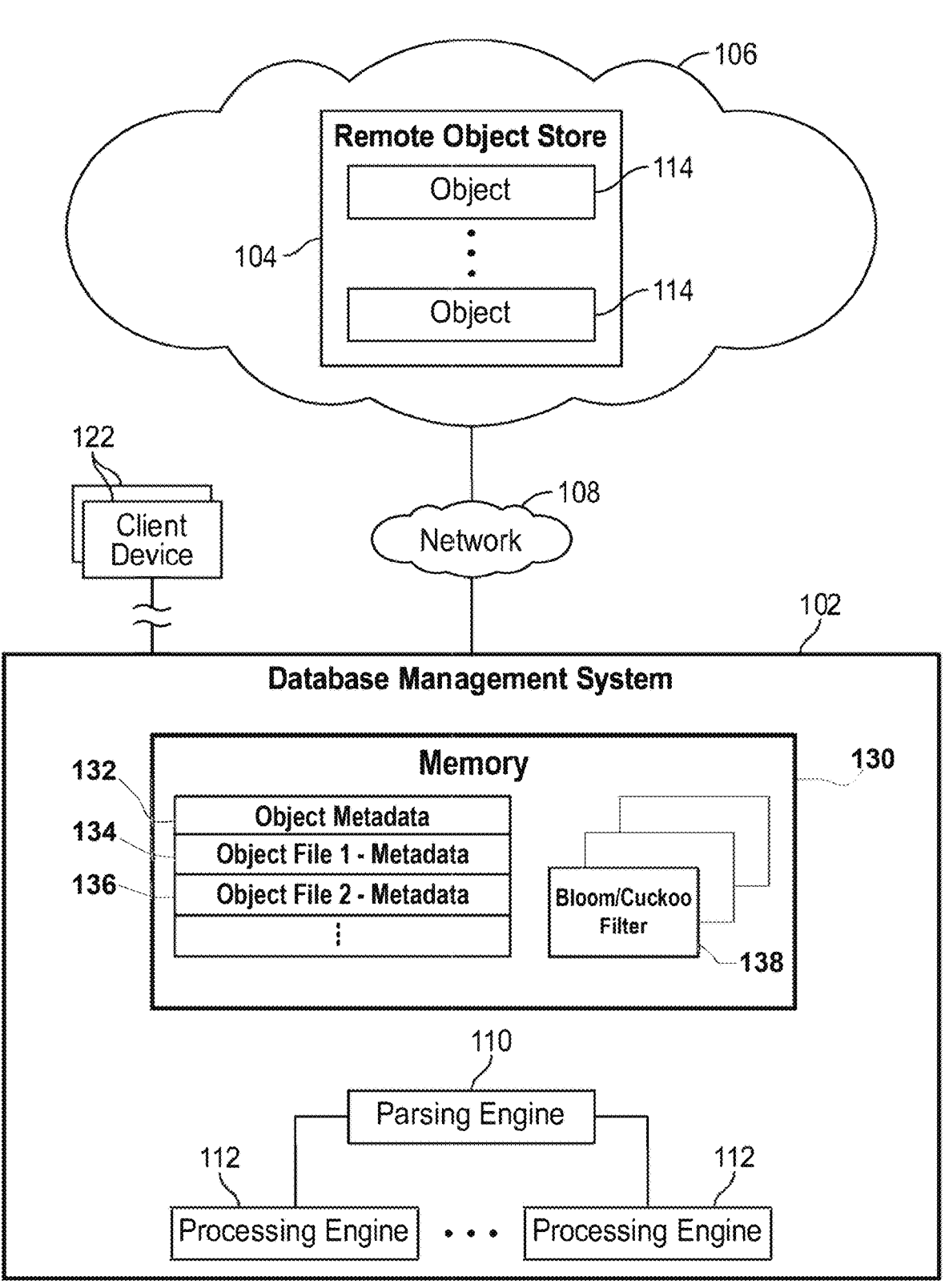
FIG. 1 is a block diagram of an arrangement including a remote object store and a database management system according to some examples.

Throughout the drawings, identical reference numbers designate similar, but not necessarily identical, elements. The drawings provide examples and/or implementations consistent with the description; however, the description is not limited to the examples and/or implementations provided in the drawings.

DETAILED DESCRIPTION OF THE INVENTION

In the present disclosure, use of the term "a," "an," or "the" is intended to include the plural forms as well, unless the context clearly indicates otherwise. Also, the terms "includes," "including," "comprises," "comprising," "have," or "having" when used in this disclosure specifies the presence of the stated elements, but do not preclude the presence or addition of other elements.

FIG. 1 is a block diagram of an example arrangement that includes a database management system (DBMS) 102 and a remote object store 104. In some examples, the remote object store 104 is an object store that stores objects 114. As used here, an "object" can refer to any separately identifiable or addressable unit of data.

The remote object store 104 can be of any of various different types of object stores. For example, the remote object store 104 can be according to any of the following: Simple Storage Service (S3) from AMAZON WEB SERVICES (AWS), Google Cloud Storage, Microsoft AZURE, and so forth. In alternative examples, the object store 104 does not have to be in a cloud, but rather can be within a data center or part of any other computing environment.

In some examples, the remote object store 104 can be accessible in a cloud 106. A "cloud" can refer to any infrastructure, including computing, storage, and communication resources, that can be accessed remotely by user devices over a network, such as a network 108 shown in FIG. 1. Alternatively, the object store 104 can be provided in a data center or in any other computing environment.

The network 108 can include a public network (e.g., the Internet), a local area network (LAN), a wide area network (WAN), a wireless network (e.g., a wireless local area the network or WLAN, a cellular network, etc.), or any other type of network.

Traditionally, a DBMS stores data of tables in a block-based storage, in which data is stored as blocks that are smaller in size than objects of object stores. A "table" can refer to a relational table of a database created to store specific data records.

In some examples, a block-based storage can include disk-based storage devices, solid state storage devices, and so forth. The block-based storage can be connected to the DBMS over a relatively high-speed link, such that the DBMS can access (read or write) data in a relational database with relatively low input/output (I/O) latency (i.e., the delay between a time that a request is submitted and a time that the request is satisfied at the storage is relatively low). The block-based storage can be considered a local storage of the DBMS, since the DBMS is able to access the block-based storage with relatively low I/O latency.

In some examples of the present disclosure, instead of or in addition to coupling block-based storage (that store base tables) to the DBMS 102, the DBMS 102 can work with the remote object store 104, which can be provided in the cloud 106 or another remote computing environment. In such examples, local block-based storage is not used with the DBMS 102 to store base tables.

The objects 114 of the remote object store 104 are the individual pieces of data stored in the remote object store. Objects have two components: object data and object metadata. Metadata identifies properties of the object, as well as specifies how the object should be handled when it' is accessed. Object metadata may be stored with an object or stored separately in the database system.

In FIG. 1, the object metadata 132 is stored in memory 130, and includes multiple entries 134, 136, and so forth, where each entry corresponds to metadata for a respective object file.

The objects 114 can have variable sizes, and each object can have a size between 10 megabytes (MB) and 100 MB. In other examples, an object can have a smaller or larger size. An object in an object store is typically larger in size than data records (e.g., rows, tables, etc.) stored in a local block-based storage.

The objects 114 can include objects of multiple tables, where each object can include rows of a given table. The rows of the given table may be contained in multiple objects. In some cases, an object can include rows of multiple tables.

When responding to a database query, the DBMS 102 can access (write or read) data of the remote object store 104, rather than table data in a relational table (or relational tables) of a local block-based storage.

DBMS 102 access and interactions with the remote object store are enabled and enhanced by the utilization of open table formats (OTFs). OTFs are open-source, standard table formats for working with very large datasets. OTFs provide a layer of abstraction on top the object store and bring database-like features to the object store. OTFs, such as Apache Iceberg and Delta Lake, offer solutions for managing large-scale object stores, enabling multiple data applications to work on the same data in a consistent manner, and ensuring data integrity.

As further shown in FIG. 1, the DBMS 102 includes a parsing engine 110 that is able to process database queries (e.g., SQL queries), including data definition language (DDL) statements and data manipulation language (DML) statements. The parsing engine 110 can include an optimizer (not shown) that can produce a query plan including database operations to be executed for processing a given database query.

In addition to the parsing engine 110, the DBMS 102 includes multiple processing engines 112 to execute database operations of a query plan. The multiple processing engines 112 are able to execute in parallel with one another, and are able to access, in parallel, different data portions (e.g., different objects 114, different portions of objects 114) of the remote object store 104. Each processing engine 112 is considered a Unit of Parallelism (UOP) that is able to execute in parallel (e.g., concurrently or simultaneously) with one or more other UOPs. Each UOP is able to perform a local relational operation, such as a join operation (e.g., to join data from multiple tables), a data aggregation operation (to aggregate multiple pieces of data into an aggregate value, such as a sum, maximum, minimum, average, median, etc.), and so forth.

In other examples, the DBMS 102 can include just one processing engine 112.

In some examples, the multiple processing engines 112 include respective different computer nodes. In other examples, the multiple processing engines 112 include respective different processors or cores of multi-core processors. In still further examples multiple database management systems may have access to the object data store.

In further examples, it is possible that some of the objects 114 can be retrieved into one or more cache memories of the DBMS 102, for quicker access during database operations.

Database queries can be submitted by one or more client devices 122 to the DBMS 102. The client devices 122 can include any or some combination of the following: a server computer, a desktop computer, a notebook computer, a tablet computer, a smartphone, a game appliance, a vehicle, a household appliance, or any other type of electronic device.

The DBMS 102 further includes a memory 130. A memory can be implemented using one or more memory devices. A memory device can include a volatile memory device, such as a dynamic random access memory (DRAM) device, a static random access memory (SRAM) device, and so forth. Alternatively, a memory device can include a nonvolatile memory device, such as a flash memory device, or any other type of nonvolatile memory device. Although shown as a single block, note that the memory 130 can be distributed as multiple memories in association with the processing engines 112.

In FIG. 1, memory 130 can also be used to store one or more probabilistic filters, e.g. bloom or cuckoo filters, 138. Probabilistic filters, such as bloom and cuckoo filters, are high-speed, space-efficient data structures well known in the art that can be used to test whether an item is a member of a set. The utilization of bloom/cuckoo filters 138 in the solutions presented herein is explained below.

In a managed object store/OTF environment, such as illustrated in FIG. 1, during a write operation usually an affected object file is not rewritten, instead the changes are written to a new file. In many implementations, this process is implemented through the use of delete files that track updates to existing data files, or rows within the files to be precise. When a row is deleted, it is added to a delete file and reconciled on each subsequent read until the files undergo a compaction process to rewrite all the data into new files that will no longer require the need for the delete file.

Figure 2:
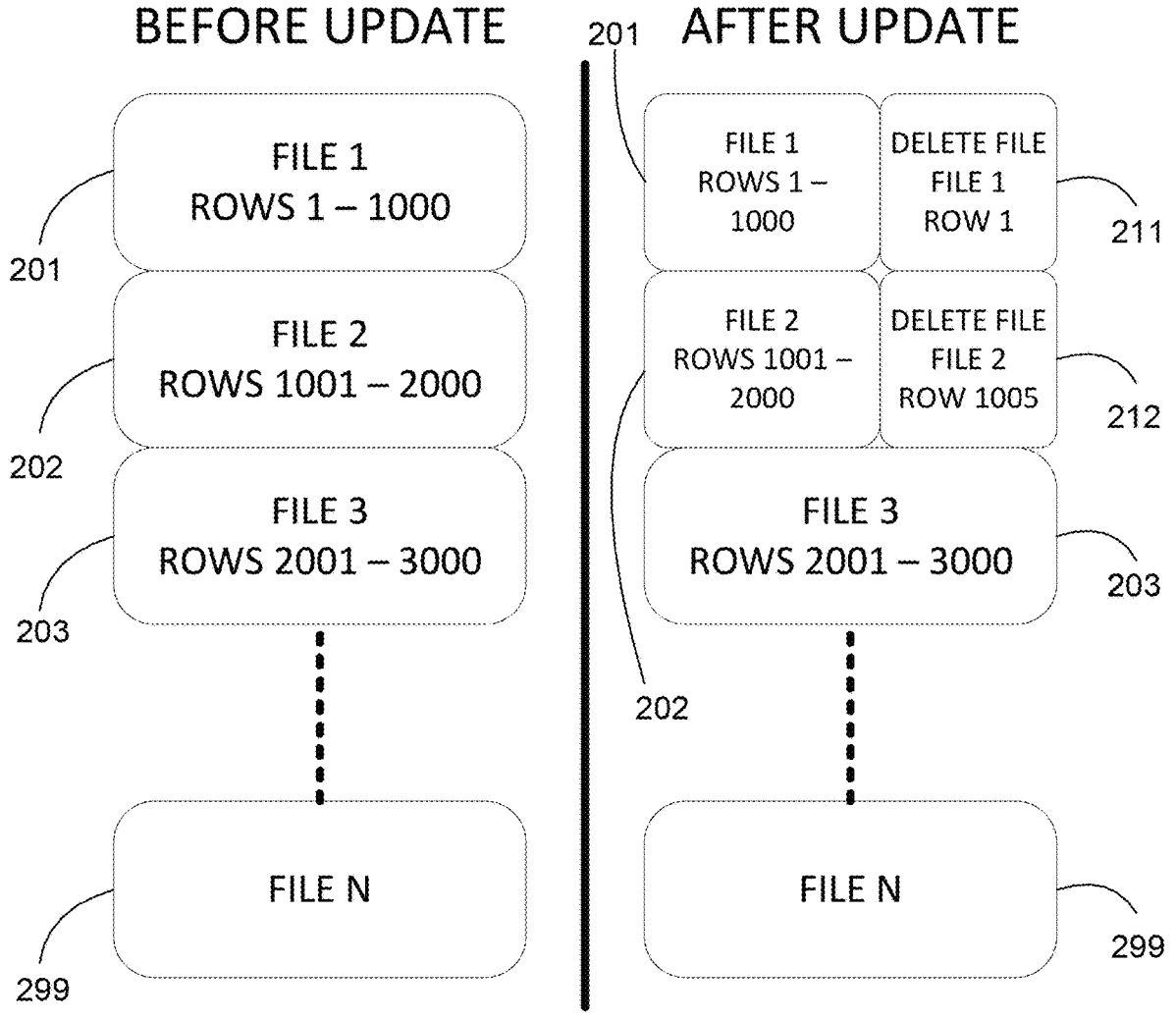
FIG. 2 illustrates the creation and use of delete files when updating file data in a managed object store with an open table format.

FIG. 2 provides an illustration of the results of this update process. In FIG. 2, object files 1, 2, 3, . . . N, identified by reference numerals 201, 202, 203 . . . 299, respectively are shown prior to, and after an update affecting rows contained in file 1 and file 2. After the update, delete files 211 and 212 are created including deleted row 1 in file 1, and row 1002 in file 2.

This process employing delete files, makes writing changes to object files much quicker, but adds additional steps to the read process when the data is subsequently read from updated files. When a row contained in an object file is read subsequent to an update, the delete file associated with the object file must be checked for the presence of the row and changes applied or merged to the original data file to form the new state of the data during processing.

There are two ways to track deleted rows in the delete file:

Position Deletes

Position deletes read files to determine which records are deleted, but instead of rewriting data files after being read, the position delete only writes a delete file that tracks the file and position/offset in that file of records to be deleted, for example: {009.parquet, position:10}. This approach favors read-heavy workloads, while writes are costly as there is a need to identify offsets in target files.

Equality Deletes

Equality deletes further reduce time and costs during write operations by avoiding reading any files at all. Instead, delete files are written to include the fields and values targeted by a query, for example, {(col1, 10), (col3, "Hello")}. This approach makes update/delete writes much faster than using position deletes as none of the existing data files are read, but attaches a much higher cost on read times since reads will have to match the delete criteria against all scanned rows to reconcile at read, i.e., every file that is being read will need to look up the delete file to determine whether a row is stale or deleted.

Improved Position Delete Process

As stated earlier many managed object stores with open table formats employ concurrency control to enable multiple writers to simultaneously modify a table partition and allow readers to see a consistent view of the table. With this approach, writes operate in three stages:

1. Read: Read the latest available version of the table to identify which files need to be modified, 2. Write: Stage changes to data and metadata by writing new files, and 3. Validate and commit: Before committing/finalizing changes to data, check whether the proposed changes conflict with any other changes that are concurrently committed. If there are no conflicts, all the staged changes are committed and the write operation succeeds. However, if there are conflicts, the write operation is aborted and restarted.

Figure 3:
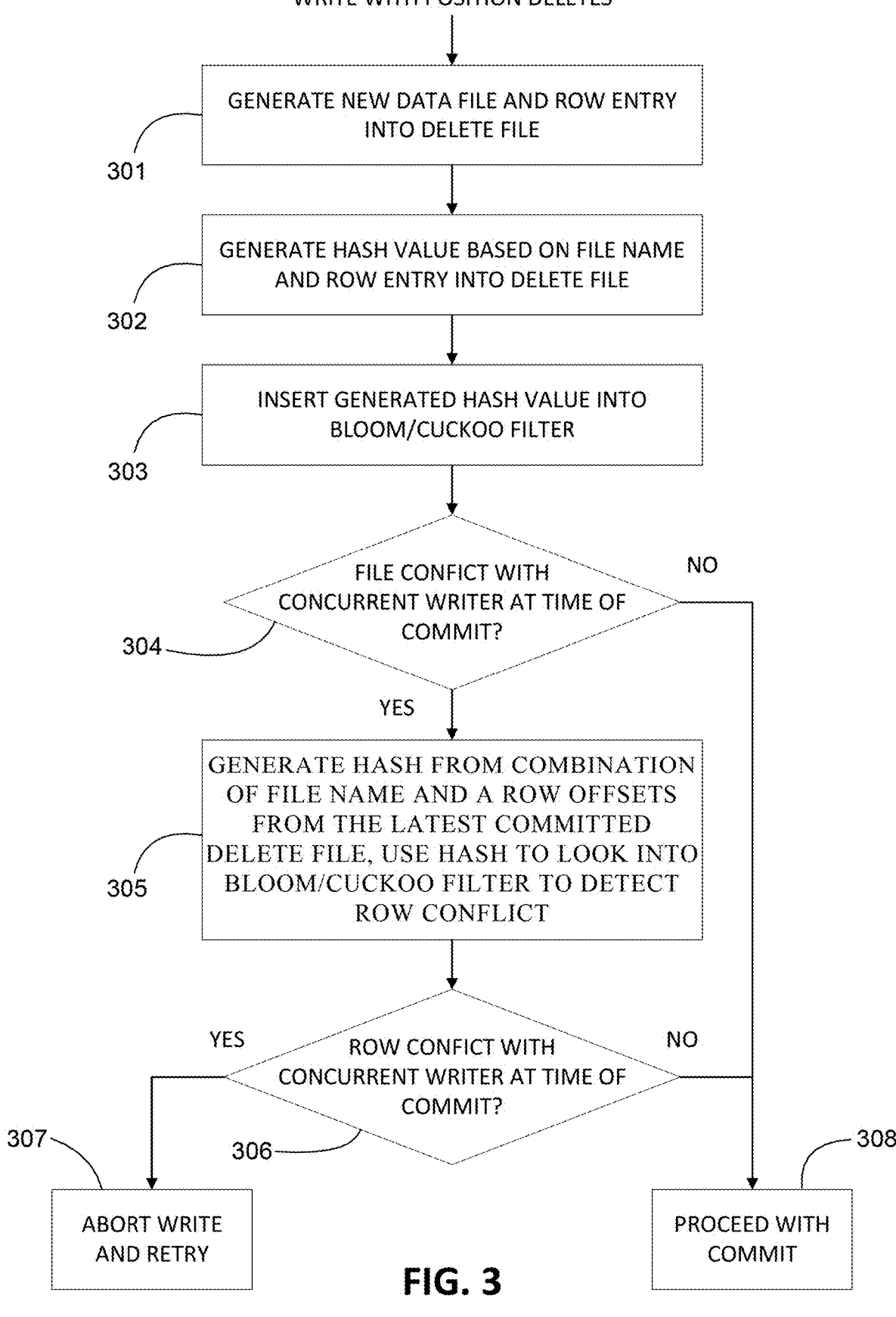
FIG. 3 is a flow diagram illustrating an improved method for performing write operations in a database system including a managed object store with an open table format in accordance with the present invention.

The process described below and illustrated in FIG. 3 is directed to improving the throughput/concurrency for writers employing position deletes by avoiding unnecessary transaction aborts due to possible conflicts. Referring to FIG. 3, every writer performs the following steps:

301. Generate a new data file and row entry into delate file.

302. Generate a hash value based on the combination of object file name and row entry in the delete file, at the time of inserting into the delete file.

303. Insert the generated hash value into a probabilistic structure, such as bloom/cuckoo filter 138.

304. Identify any file conflicts with other concurrent writers. If there are no file conflicts, the current writer could proceed with commit (step 308).

305. At the time of commit, in case of an identified file conflict from a concurrent write, the current writer uses the combination of file name and a row offsets from the latest committed delete file to generate a hash and uses the hash to look into the cuckoo filter 138 for the current writer to detect a possible row conflict.

306. In case of an identified row conflict because of a genuine row-level conflict, or because of the false positive nature of the probabilistic data structure, the current writer aborts and retries the query (step 307). If there are no row conflicts, the current writer could proceed with commit (step 308).

Using the approach illustrated in FIG. 3, every writer would create a bloom/cuckoo filter at the time of starting a write operation and erase the filter after commit.

An example of this process for two concurrent writer follows:

1. A first writer W1 is executed to update (file1, row1) and (file2, row1005).

2. A second writer W2 is executed to update (file2, row 1004), (file3, row 2010).

3. The first writer W1 populates entries into its bloom/cuckoo filter F1 based on hash (file1, row1), hash (file2, row1005). Similarly, second writer W2 populates entries in another bloom/cuckoo filter F2.

4. If writer W1 commits first, the delete file(s) would have entries corresponding to (file1, row1), (file2, row 1005). Writer W2, at the time of commit, detects that there was a concurrent writer who committed first. Subsequently, writer W2 looks into the delete file(s), generates hash for entries in the delete file and verifies if there is a match in bloom/cuckoo filter F2. In this example there will not be a match unless there is a false positive scenario.

5. Thus, W1 and W2 can commit even in case of conflict involving file 2.

Note that with a managed object store and OTF and the write process described above, multiple writers from different database nodes, or from different RDBMS engines, such as a DBMS from Teradata Corporation or other DBMS providers, may provide concurrent writes. In such cases, the bloom or cuckoo filter 138 may be located at a common storage location accessible to all nodes or DBMS engines, instead of within the DBMS as shown in FIG. 1.

Improved Equity Delete Process

Figure 4:
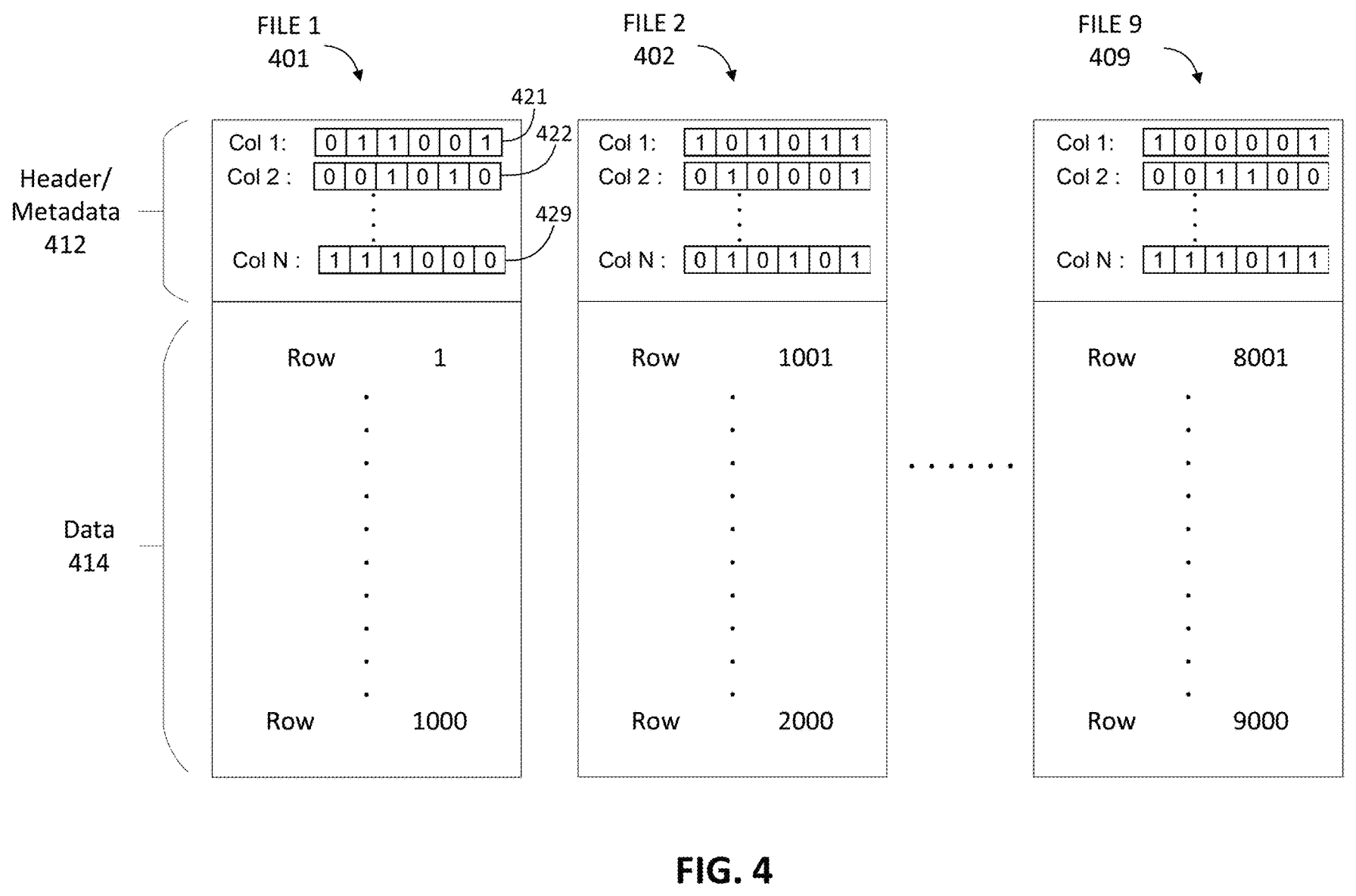

As stated earlier, the equity delete process attaches a high cost on read times as reads will have to match the delete criteria against all scanned rows to reconcile at read, i.e., every file that is being read will need to look up the delete file to determine whether a row is stale or deleted. The approach described below and illustrated in FIG. 4 and FIG. 5 is directed to improving the efficiency for read operations when employing an equity delete process.

The efficiency of read operations for an equality delete file mechanism is improved by maintaining a file-level per-column (or optionally, for a subset of interested/most frequently modified columns) bloom filter, and using those bloom filters to filter out a majority of the value combinations in a delete file which are irrelevant for a file while reading data files. FIG. 4 illustrates the inclusion of column-level Bloom filters within object data file headers in a managed object store with an open table format. Referring to FIG. 4, a plurality of object data files, labeled FILE 1 and FILE 2 through FILE 9, and identified with reference numerals 401, 402, and 409, respectively, are shown. Each object data file includes a header portion 412 and data portion 414. Each header includes metadata associated with the object data file, which may also include a bloom filter 421, 422, and 429 for each column of data contained within the file.

Figure 5:
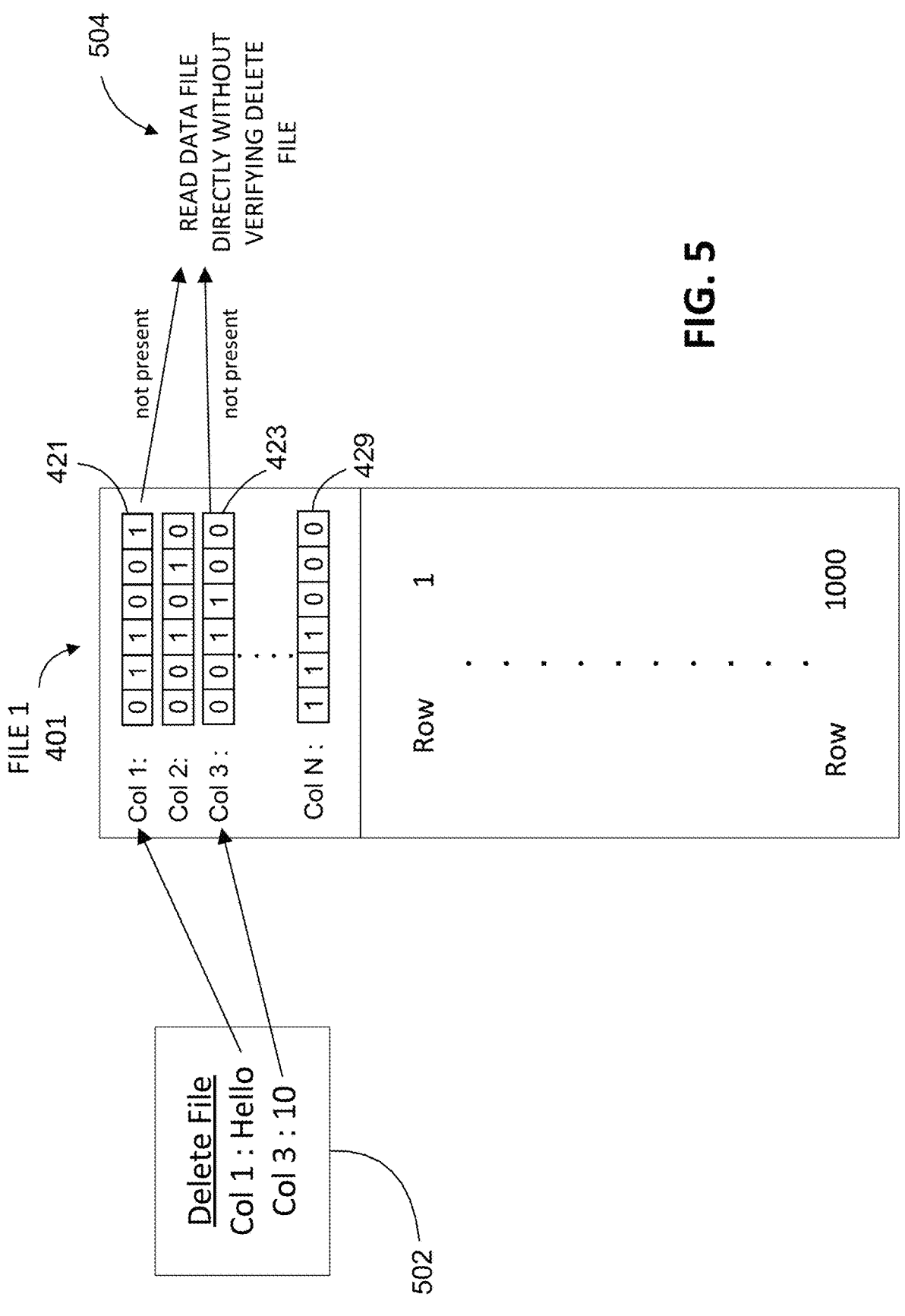
FIG. 5 illustrates an improved method for performing read operations in a database system including a managed object store with an open table format in accordance with the present invention.

FIG. 5 illustrates an improved method for performing read operations in a system employing an equity delete process, making use of the column-level bloom filters included in the file headers.

With the proposed approach, for each entry in a delete file 502, the read operation will investigate the corresponding bloom filters in the header part of the data file associated with the columns involved in the delete file entry and determine if a matching entry is part of the data file or not. For example, if delete file 502 includes entries {(col1, 10), (col3, "Hello")}, the read process generates a hash for the entries in the delete file and verifies if there are matches in the bloom filters for columns 1 and 3, filters 421 and 423, respectively. The bloom filters associated with col1 and col3 are individually looked up to see if the data file contains a row with values of 10 in col1, and "Hello" in col3. If both bloom filters 421 and 423 indicate that a corresponding entry is present, it is considered. Else, the entry is skipped, and subsequent entries in the delete file are looked up. An example illustrating the benefits of this process follows.

Consider a managed object store/OTF table which is comprised of 1 million files, with each file consisting of an average of $100k$ rows. Over a period, if 10 k write operations (updates/deletes) are performed for every operation, 10 k entries, i.e. fields and values targeted by the operation, will be made into a delete file. Thus, any subsequent read operation on the table may need to possibly scan the entire table, which would imply that for each of the 100 k rows in a file, to determine if a row is not stale, all 10 k entries in the delete file will need to be scanned, which results in 10 k (number of entries in delete file)*100 k (number of rows in a file) checks per file, i.e., one billion stale checks per file.

Employing the proposed approach, at the end of the delete file scan, if there are 100 entries identified out of the 10 k delete file entries, the number of stale checks would be 100 (filtered delete file entries based on bloom filter)*100 k (number of rows in the file), or 10 million stale checks per file. The number of stale checks with this proposed approach will vary based on the number of matching deleted rows present in a data file. In the worst case, all the entries in a delete file may be reported as matching—a very rare occurrence which would only occur when all the rows of a file have been modified. But even in this worst-case scenario, the overhead is just one extra scan of the delete file in addition to the bloom filter lookup.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A database system comprising:
one or more processors; and
a non-transitory storage medium storing instructions executable on the one or more processors to:
in response to a request to update a row of data from a table, access an object data file containing data of the table, wherein the object data file is stored in a remote object store;
generate a hash value from a file name and row identifier for said row of data;
insert said hash value for said row of data into a probabilistic data structure;
commit to saving said update of said row of data to said remote object store;
identify any object data file update conflict between said request and a concurrent request to update data within said object data file;
save said update of said row of data to said remote object store when no object data file update conflict has been identified;
when an object data file conflict has been identified:
generate a hash table from a delete file containing rows of data identified as deleted during execution of prior requests to update data within said object data file;
identify any row matches of hash values contained in said hash table with hash values contained within said probabilistic data structure;
save said update of said row of data to said remote object store when no row matches have been identified; and
abort said update of said row of data when a row match has been identified.

2. The database system according to claim 1, wherein said probabilistic data structure comprises a bloom filter.

3. The database system according to claim 1, wherein said probabilistic data structure comprises a cuckoo filter.

4. The database system according to claim 1, wherein said request to update said row of data comprises a write of a new row of data.

5. The database system according to claim 1, wherein said remote object stare comprises a managed object store with an open table format.

8

6. A database system comprising:
one or more processors;
a non-transitory storage medium storing instructions executable on the one or more processors to:
in response to a request to read a row of data from a table, access an object data file containing data of the table, said object file further including a column-level probabilistic data structure for each column in said table; each said probabilistic data structure including hash values for all data entries contained within its associated column, wherein the object data file is stored in a remote object store;
generate a hash table from a delete file containing rows of data identified as deleted during execution of prior requests to update data within said object data file;
identify any matches of hash values contained in said delete file hash table with hash values contained within said column-level probabilistic data structures;
remove from read consideration table rows including data entries identified as containing matching values with said delete file, and
scan the table rows remaining after the removal from read consideration of table rows including data entries identified as containing matching values with said delete file in execution of said read request.

7. The database system according to claim 6, wherein said probabilistic data structure comprises a bloom filter.

8. The database system according to claim 7, wherein said remote object stare comprises a managed object store with an open table format.

9. A method of database system comprising a hardware processor, the method comprising the steps:
in response to a request to update a row of data from a table, accessing an object data file containing data of the table, wherein the object data file is stored in a remote object store;
generating a hash value from a file name and row identifier for said row of data;
inserting said hash value for said row of data into a probabilistic data structure;
committing to saving said update of said row of data to said remote object store;
identifying any object data file update conflicts between said request and a concurrent request to update data within said object data file;
saving said update of said row of data to said remote object store when no object data file update conflict has been identified;
when an object data file conflict has been identified:
generating a hash table from a delete file containing rows of data identified as deleted during execution of prior requests to update data within said object data file;
identifying any row matches of hash values contained in said hash table with hash values contained within said probabilistic data structure;
saving said update of said row of data to said remote object store when no row matches have been identified; and
aborting said update of said row of data when a row match has been identified.

10. The method according to claim 9, wherein said probabilistic data structure comprises a bloom filter.

11. The method according to claim 9, wherein said probabilistic data structure comprises a cuckoo filter.

12. The method according to claim 9, wherein said request to update said row of data comprises a write of a new row of data.

13. The method according to claim 9, wherein said remote object stare comprises a managed object store with an open table format.

14. A method of database system comprising a hardware processor, the method comprising the steps:

in response to a request to read a row of data from a table, accessing an object data file containing data of the table, said object file further including a column-level probabilistic data structure for each column in said table; each said probabilistic data structure including hash values for all data entries contained within its associated column, wherein the object data file is stored in a remote object store;

generating a hash table from a delete file containing rows of data identified as deleted during execution of prior requests to update data within said object data file;

identifying any matches of hash values contained in said delete file hash table with hash values contained within said column-level probabilistic data structures;

removing from read consideration table rows including data entries identified as containing matching values with said delete file, and scanning the table rows remaining after the removal from read consideration of table rows including data entries identified as containing matching values with said delete file in execution of said read request.

15. The method according to claim 14, wherein said probabilistic data structure comprises a bloom filter.

16. The method according to claim 14, wherein said remote object stare comprises a managed object store with an open table format.

\*    \*    \*    \*    \*